(12) United States Patent
Uzuhashi et al.

(10) Patent No.: US 6,455,090 B1
(45) Date of Patent: Sep. 24, 2002

(54) LIQUID ADDITIVE FOR THICKENER

(75) Inventors: Yuji Uzuhashi; Hiroki Miyashita, both of Ina (JP)

(73) Assignee: INA Food Industry Co., Ltd. (JP)

( * ) Notice: Subject to any disclaimer, the term of this patent is extended or adjusted under 35 U.S.C. 154(b) by 0 days.

(21) Appl. No.: 09/494,069

(22) Filed: Jan. 28, 2000

(51) Int. Cl.⁷ .................................. A23L 1/05
(52) U.S. Cl. ................. 426/573; 426/578; 426/661
(58) Field of Search ........................ 426/573, 580, 426/578, 661, 519

(56) References Cited

U.S. PATENT DOCUMENTS

| | | | |
|---|---|---|---|
| 4,957,764 A | * | 9/1990 | Okonogi et al. |
| 5,538,751 A | * | 7/1996 | Carter et al. |
| 5,641,532 A | * | 6/1997 | Pflaumer et al. |
| 5,792,502 A | * | 8/1998 | Montezinos |
| 5,932,235 A | * | 8/1999 | Ninomiya et al. |
| 6,132,793 A | * | 10/2000 | Benesh |
| 6,139,895 A | * | 10/2000 | Zablocki et al. |

FOREIGN PATENT DOCUMENTS

| | | | |
|---|---|---|---|
| JP | 538262 | | 2/1993 |
| JP | 05038262 A | * | 2/1993 |
| JP | 5153919 | | 6/1993 |
| JP | 8280334 | | 10/1996 |
| JP | 951764 | | 2/1997 |
| JP | 10108633 | | 4/1998 |
| JP | 11018723 A | * | 1/1999 |
| JP | 11169106 A | * | 6/1999 |
| JP | 11187827 A | * | 7/1999 |
| JP | 11187827 | | 7/1999 |
| JP | 11318356 A | * | 11/1999 |
| JP | 11318356 | | 11/1999 |

* cited by examiner

*Primary Examiner*—Nina Bhat
(74) *Attorney, Agent, or Firm*—Webb Ziesenheim Logsdon Orkin & Hanson, P.C.

(57) ABSTRACT

There is provided a liquid additive thickener, or a liquid thickening agent, which can thicken easily when it is added to an object. The liquid additive thickener comprises a liquid that is prepared by dissolving a thickening agent into water and is initially inhibited from forming viscous solutions or gels. The liquid can begin to form a viscous solution when it is added to a water-containing object. The liquid may be: (a) prepared to have a low viscosity by dissolving a thickening agent into water together with a poor solvent; (b) prepared to have a low viscosity by dissolving a thickening agent into water together with a low viscous saccharide; or (c) prepared to have a low viscosity by dissolving a thickening agent into water together with a reactive ion.

17 Claims, 4 Drawing Sheets

Use of Arabic Gum together with Xanthan Gum

LIQUID ADDITIVE FOR THICKENER

BACKGROUND OF THE INVENTION

1. Field of the Invention

The present invention generally relates to a liquid additive thickener which can be added in an object (liquid or liquid solid mixture) to easily form viscous solutions and gels. More particularly, the present invention relates to a liquid additive thickener which is suitable for use in foods to thicken gravy, dressing, sauce, mousse and jelly easily. The liquid additive thickener is also added suitably to foods for a patient who has mastication and degluttition difficulties due to an eating disorder so as to form viscous solutions and gels easily.

2. Description of the Related Art

Various thickening agents have been employed in foods as stabilizers for thickeners in the art. These thickening agents are commercially available as dried products in the form of powder, plate and thread, and can be dissolved in cold or hot water in use. The dissolution of such thickening agents, however, generally requires much time and labor. In addition, some thickening agents would produce lumps and cause defective dissolution due to inadequate heating. Sometimes, thermal decomposition may occur. Accordingly, it is not always easy for general consumers to utilize the thickening agents.

No multi-purpose additive thickener in the form of liquid has been either available in practice or even conceived yet in the art. For example, there has been known a seasoned liquid that is mixed with milk to make a dessert mousse. This liquid realizes the form of mousse through the use of a reaction with calcium in milk. Therefore, it has a specified limitation in use. In addition, it is limited in special uses because it is seasoned.

A large disadvantage occurs when the thickening agent is employed to adjust viscosity and the like of nursing and training foods for patients who have mastication and degluttition difficulties caused by an eating disorder. There has been recently noted a technology that can thicken or coagulate foods for persons with mastication and deglutition difficulties. Conventional thickening agents have such forms, however, that are difficult to thicken and coagulate food. For example, the form of powder may invite lumps. In order to improve this problem by formation of particles, a dissolution time would be increased. In addition, a lump may still be formed when the food is heated.

Accordingly, such an additive is desirable that can easily impart viscosity to a water-containing object or gelate it without requiring. the time and labor for heating to dissolve the additive and without causing a lump, as in the case of powder. In particular, such properties are strongly desired for the thickening agent that imparts viscosity and coagulation on the nursing and training foods for the person with mastication and deglutition difficulties.

The present invention has been made to satisfy the above requirements and accordingly has an object to provide a liquid additive thickener, or a liquid thickening agent, which can be added into food and so forth to easily thicken.

SUMMARY OF THE INVENTION

The present invention is provided with a liquid additive thickener which comprises a liquid with a fluidity prepared by dissolving a thickening agent into water. The liquid begins to form viscous solutions or gels when it is added to a water-containing object (liquid or liquid solid mixture).

Such the liquid additive thickener is actually prepared as a liquid with a fluidity by adjusting a dissolved concentration of the thickening agent, by inhibiting formation for viscous solution for viscosity of the thickening agent or by employing both.

A liquid thickening agent is inevitably diluted when it is added to a water-containing object, such as food. Therefore, this remains a disadvantage that a certain viscosity and coagulation force larger than those required for the object must be initially imparted on the liquid thickening agent. In addition, if a large amount of the liquid thickening agent is employed to the object, the dilution also becomes large. This causes another disadvantage that factors other than the viscosity and coagulation force may be varied.

For example, when imparting viscosity on a seasoned food, the larger dilution intends to reduce the taste more. Therefore, where the liquid thickening agent is simply produced by the conventional method so as to obtain a desired viscosity and coagulation force without greatly diluting the object, it has a high initial viscosity and thus loses its fluidity. This kind of liquid thickening agent is not easy to use. In addition, even where it is added to food, a desired viscosity and formation for gels (gelation) cannot be obtained by dispersing it over the whole food.

The present invention has the advantage that the thickening agent is dissolved in a liquid and it retains its fluidity on mixing. The liquid may be actually prepared by inhibiting initial viscosity formation for viscous solution of the thickening agent so that the liquid can begin to form viscous solutions and gels after it is added to the object. The liquid may also be prepared by dissolving a reactive thickening agent in a range of concentrations that can provide the liquid with a fluidity so that the liquid can begin to form viscous solutions and gels after it is added to the object together with a component that is reactive with the thickening agent at the same time.

Thus, the prepared liquid thickening agent, unlike the powder, does not make lumps and can be dissolved rapidly without heating when it is added to the object, resulting in a desired viscosity and gelling in a short time.

Although the above-described liquid additive thickeners have not been known in the art, their new uses can be expected according to the present invention.

Consumers have come to have various preferences reflecting individual practices. As for viscosity and formation for gels of foods, they require highly flexible commodities rather than uniform commodities. They require fresh hand-made foods with strictly selected materials rather than ready-made commodities that are mass produced as processed foods. It has not been easy in the art, however, to impart preferable viscosity on, for example, a hand-made dressing so as to adhere to vegetables and so forth to a certain extent. Imparting viscosity in sauces for meat and fish dishes, adjusting viscosity of a liquid starch dressing, and imparting viscosity on a fruit sauce present similar requirements.

The use of the present invention can readily impart and adjust viscosity on the above-described various gravy and so forth and obtain individualized hand-made foods easily. In addition, such commodities as ready-to-serve foods in combination with the liquid additive thickener, according to the present invention, can be realized, which includes, for example, an easy dressing essence that contains a seasoning mix in combination with the liquid additive thickener.

Further, the liquid additive thickener, according to the present invention, can realize the nursing and training foods that form objective viscous solutions and gels in a short time when it is added supplementary to the foods for the person with mastication and deglutition difficulties.

BRIEF DESCRIPTION OF THE DRAWINGS

The present invention will be more fully understood from the following detailed description with reference to the accompanying drawings in which.

DETAILED DESCRIPTION OF THE PREFERRED EMBODIMENTS

Embodiments of the present invention will be described below.

A thickening agent to be used in the present invention includes one selected from guar gum, locust bean gum, tara gum, xanthan gum, tamarind gum, tragacanth gum, karaya gum, konjac mannan, sodium CMC, sodium alginate, pectin, azotobacter vinelandii gum, carrageenan, modified starch, cassia gum, psyllium seed gum, CMC and methyl cellulose.

A first method of preparing such a thickening agent as a liquid with a low viscosity is to dissolve it into water together with a poor solvent.

In a known conventional method of producing a thickening agent to dehydrate a solution of the thickening agent that is extracted as an aqueous solution, ethylalcohol, acetone and isopropylalcohol are employed to precipitate it. The first method balances the dissolution of the thickening agent in the mixed solvent of water and the ethylalcohol so as to retain the viscosity of the solution in a low state, for example, by utilizing characteristics of ethylalcohol, acetone and isopropylalcohol as the poor solvents for the thickening agent.

The poor solvent may also include fats and oils, surfactants and the like.

Embodied examples are to be shown below.

Ten parts by weight of sodium alginate were dissolved into 100 parts by weight of a mixed solvent of water and ethylalcohol (weight ratio=1:1) to prepare a liquid thickening agent. This liquid thickening agent was then subjected to a B-type viscometer (VISTMETRON available from Shibaura System: a rotation speed of 60 rpm; a rotor of No. 1; a measurement temperature of 25° C.) to measure its viscosity, which indicated 15.5 cP.

When 20 parts by weight of the liquid thickening agent were dispersed and dissolved into 100 parts by weight of water, a viscous solution was formed. The viscosity was measured under the same measurement conditions as above except that a rotor of No. 3 was employed, which indicated 1876 cP.

Figure 1:
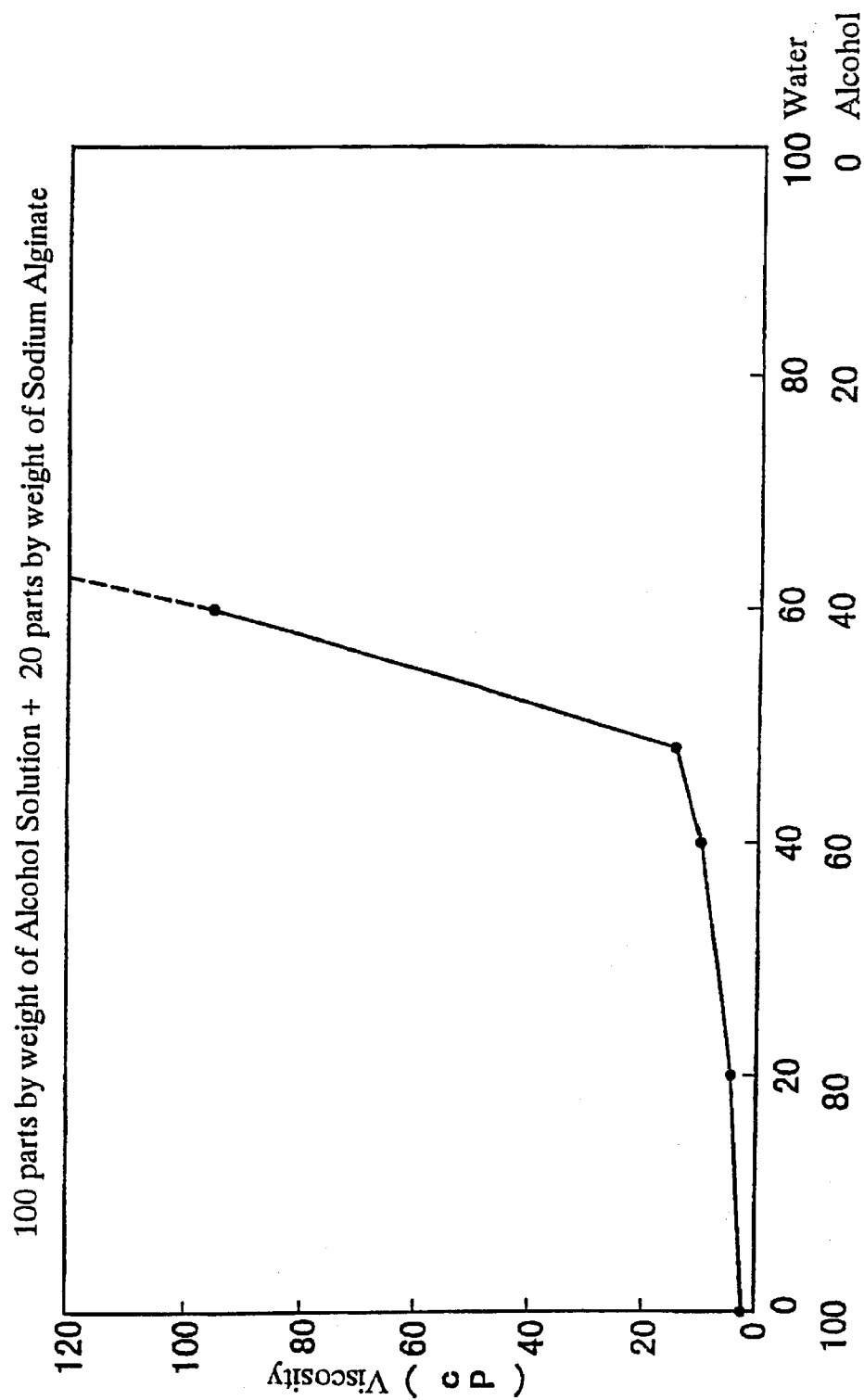
FIG. 1 is a diagram showing a measured result with respect to a dependency on alcohol concentration of viscosity of a liquid thickening agent including sodium alginate dissolved in a solution of ethylalcohol.

FIG. 1 shows a measured result with respect to viscosity of the mixture of 100 parts by weight of the mixed solvent of water and ethylalcohol and 10 parts by weight of sodium alginate dissolved therein, in which a mixing ratio of the mixed solvent is varied. It is obvious from this result that a system that is mixed with the poor solvent of ethylalcohol has a well-inhibited viscosity and excellent fluidity rather than a system that is dissolved only in water. The example has a higher viscosity than a mixed solvent system that contains much ethylalcohol rather than water. This shows that sodium alginate is in a dissolved state and is ready to form viscous solution immediately after it is added to the object.

A low viscous liquid thickening agent can be obtained by this method with the following mechanism. In a state of solution, the above-described thickening agent has a molecule in the form a freely-extended, random coil and forms a viscous solution through hydrogen bonding with water. To the contrary, when additionally employing ethylalcohol than can be highly dissolved into water, the ethylalcohol bonds to water and prevents the thickening agent from hydrogen bonding. Accordingly, the thickening agent loses its flexibility and becomes a partially crystallized molecule while it is still in the state of solution. As a result, it can be assumed that the viscosity of the solution is maintained low.

A second method of preparing the above-described thickening agent as a liquid with a low viscosity is to dissolve it into water together with a low viscous polysaccharide. The low viscous polysaccharide may be at least one selected from arabic gum, pullulan, soy bean polysaccharide or arabinogalactan. These polysaccharides have a characteristic to become a liquid that has a low viscosity and excellent fluidity and can be easily treated even when they are dissolved in water at a high concentration. The inventors discovered that these polysaccharides serve the same roles, as the poor solvents do in the first method, when they coexist at a high concentration with the thickening agent in the solution.

It is assumed that the second method can be effected for the following reason. When a polysaccharide is dissolved at a high concentration, hydrophilic groups of the polysaccharide make many hydrogen bonds with water, take water molecules therein, apparently increase hydrophobic groups, and reduce free water molecules to which the thickening agent can make hydrogen bonds when it is dissolved. Therefore, it can be considered that although the thickening agent is dissolved mare than the state of powder, it cannot reach to the random state in which molecules extend freely. In addition, the thickening agent still has partial crystal-like molecules and results in a low solution viscosity.

These polysaccharides work particularly in a solution dissolved at a high concentration, for example, in a range of 3–50%, preferably 8–30% in the case of arabic gum. If a concentration is below this range, the solution forms viscous solution and loses fluidity when the thickening agent is added. Thus, the solution cannot be maintained in a low viscous state preferable for a liquid additive thickener. Although a liquid with a fluidity can be of course obtained by lowering the concentration of the thickening agent, it is inferior in the function to form viscous solutions when it is added to the water-containing object. If a concentration exceeds the above range, arabic gum increases its viscosity.

An example, according to the second method, will be described below.

Ten parts by weight of arabic gum were dissolved into 85 parts by weight of water to prepare a solution of arabic gum.

The resultant solution has a sufficiently large fluidity. A viscosity of the solution was measured under the same condition as that of the preceding example (rotor No. 1), which indicated 10.5 cP.

Five parts by weight of xanthan gum was added to the solution of arabic gum to prepare a liquid thickening agent. This liquid thickening agent indicated a viscosity of 648 cP (measured with a rotor of No. 3).

Figure 2:
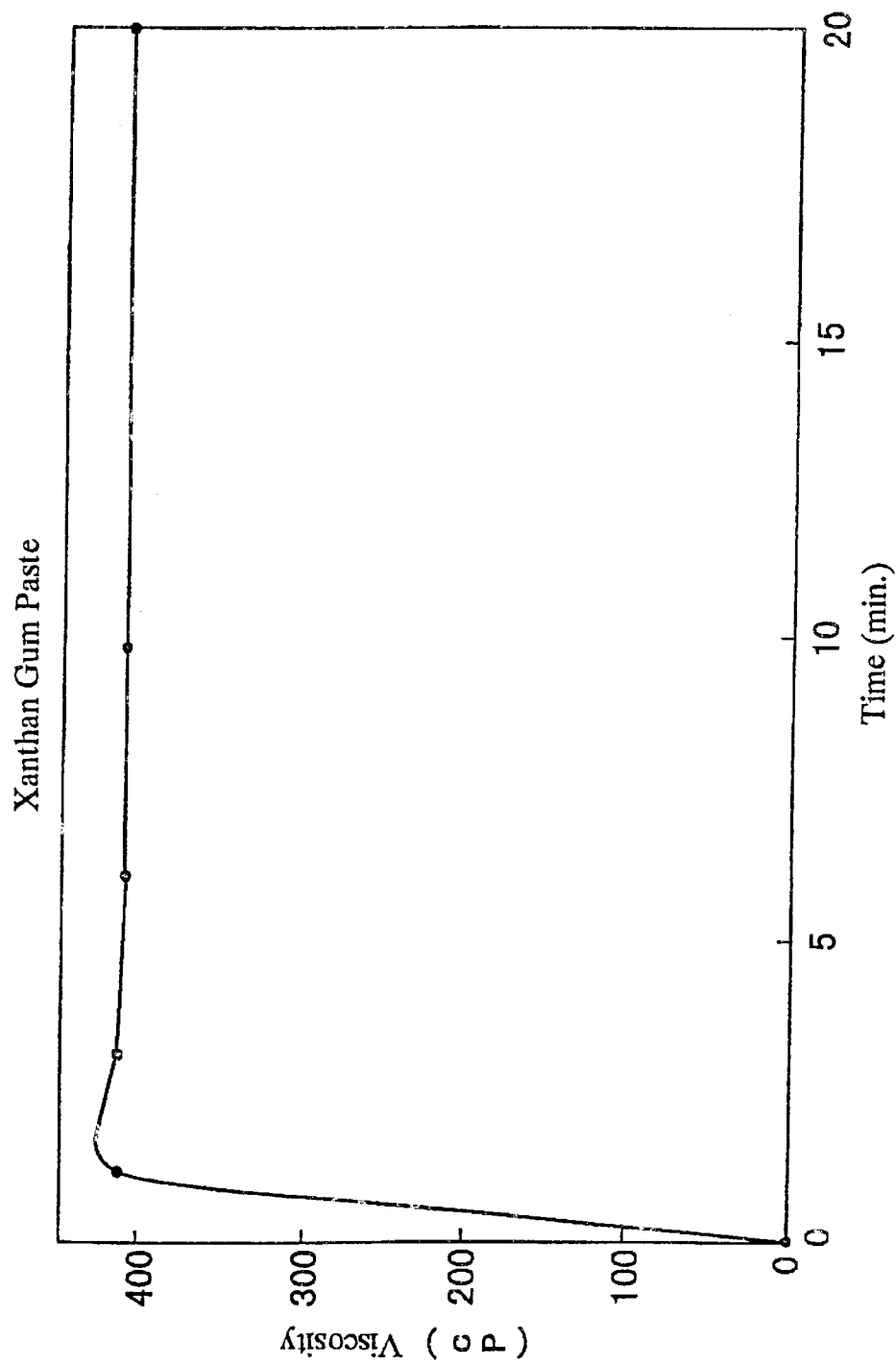
FIG. 2 is a diagram showing a measured result with respect to time-varying viscosity formation of a liquid thickening agent including xanthan gum dissolved in a solution of arabic gum.

When 20 parts by weight of the resultant liquid thickening agent were dissolved into 100 parts by weight of water, the resultant mixture immediately formed viscous solution, which was measured as 412 cP. FIG. 2 shows a measured result with respect to a relation between the elapsed time and the viscosity. It can be confirmed from this result that the rise of the formation for viscous solution of viscosity is very fast.

When the liquid thickening agent of xanthan gum is dissolved in milk, consomme soup and salad dressing, respectively, the resultant mixture formed the similar viscous solution. This is because the xanthan gum is a thickening agent having a low reaction with a salt and the like. This ensures that this liquid thickening agent can be effectively applied to many uses.

Figure 3:
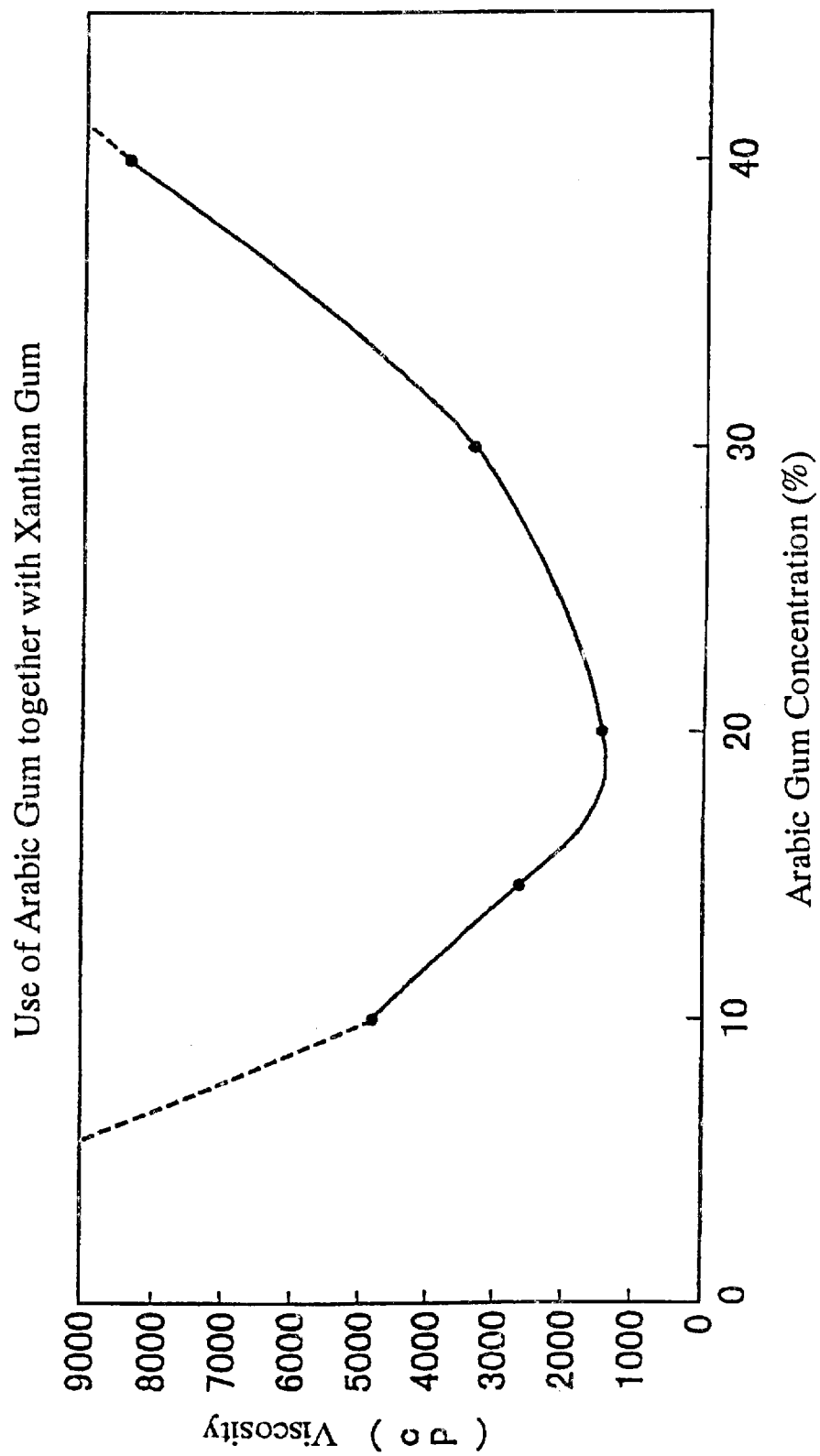
FIG. 3 is a diagram showing a measured result with respect to a dependency on arabic gum concentration of viscosity of the same liquid thickening agent including xanthan gum dissolved in the solution of arabic gum.

A plurality of liquid thickening agents of xanthan gum were prepared at the same concentration as above using solutions of arabic gum at different concentrations. FIG. 3 shows a measured result with respect to viscosity of these liquid thickening agents. It can be confirmed from this figure that the liquid thickening agent of xanthan gum with the solution of arabic gum has a lower viscosity than that of the liquid thickening agent of xanthan gum only with water and that arabic gum obviously imparts fluidity on the liquid thickening agent.

A third method of preparing a thickening agent as a liquid with a low viscosity is to dissolve it into water together with reactive ions. The reactive ions herein include a metal ion, such as potassium, calcium or magnesium. Although it is known that a solution of pectin or sodium alginate makes an ionic bond with calcium or magnesium and becomes a gel state, at first, these ions intend to work to lower the viscosity of the solution when they are a small amount. Further, to control reactions of these divalent metal ions, sodium citrate and sodium metaphosphate may be effectively employed at the same time for the purpose of metal blocking.

The mechanism that can maintain the liquid thickening agent to be viscous by using such metal ions at the same time is explained below. In a state of solution, the above-described thickening agent has a molecule in the form of a freely-extended, random coil and forms viscous solutions through hydrogen bonding with water. It is assumed that when a small amount of the reactive ions is added into the solution, molecules of the thickening agent lose flexibility and the thickening agent is bound by metal ions and is inhibited to make hydrogen bonds with water. As a result, the viscosity of the solution is suppressed low.

An example, according to the third method, will be described below.

Five parts by weight of cold water-soluble carrageenan was dissolved in 100 parts by weight of a solution of salt that previously contained 5 parts by weight of common salt. The resultant liquid thickening agent was measured with respect to viscosity (a rotor of No. 4), which indicated 5000 cP. A solution without common salt indicated a viscosity of 40000 cP (a rotor of No. 4, revolutions of 30 rpm). This indicates that the viscosity of the liquid thickening agent is obviously suppressed.

When 20 parts by weight of the resultant liquid thickening agent were dispersed and dissolved into 100 parts by weight of water, a viscous solution was formed. When milk was further added to the mixture, a much higher viscous solution was formed. This is a result from a reaction between carrageenan and milk calcium.

A method of dissolving the thickening agent into water along with a low molecular glucide can be considered as an application of the second method. If sugar or sweetener is required, for example, dissolving erythritol at a high concentration, the thickening agent can maintain a low viscosity. An example of this method is to be described below.

Ten parts by weight of tara gum were dissolved in 100 parts by weight of a solution of sorbitol with 70% sugar content. The resultant solution was measured (a rotor of No. 3) which indicated a viscosity of 870 cP and exhibited a large fluidity. When 10 parts by weight of the liquid thickening agent were dispersed and dissolved in 100 parts by weight of water, the resultant mixture indicated a viscosity of 1350 cP 20 minutes later.

Figure 4:
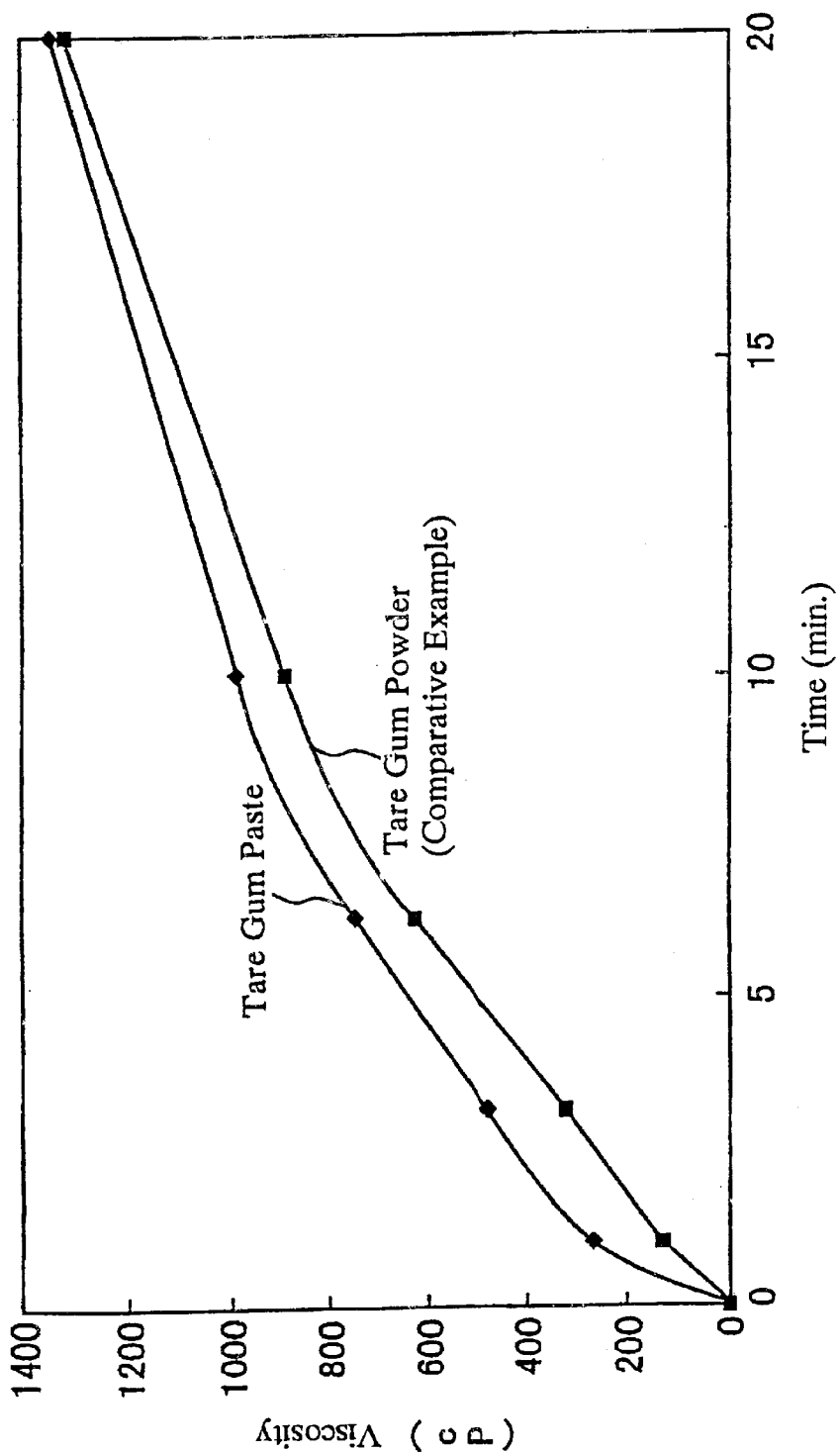
FIG. 4 is a diagram showing a measured result with respect to viscosity formation of a liquid thickening agent including tara gum dissolved in a solution of sorbitol when the liquid thickening agent is dissolved in water. The diagram also shows a comparative example.

FIG. 4 shows a measured result with respect to time-varying viscosity formation for viscous solution of the resultant liquid thickening agent together with a comparative example. The comparative example is prepared by dispersing and dissolving mixed powders, which consist of 1 part by weight of tara gum powder and 7 parts by weight of sorbitol powder, into 100 parts by weight of water. It can be understood that the example forms the objective viscous solution faster than the comparative example of mixed powders.

Where at least one of heat reversible coagulant is selected from agar, gellan gum, carrageenan, furcelleran and gelatin and is employed as the thickening agent, by applying the above-mentioned first through third methods, a solution state can be maintained without formation for gels and structural transition when heated to dissolve and then cooled. Namely, by the same mechanism as described in the first through third methods, molecules of the thickening agent are inhibited to bond with water and come in a bound state in which they cannot make a double helix structure for gelling even in a coagulation temperature range and thus maintain a solution state with a low viscosity.

An example of this embodiment is to be described below.

Five parts by weight of agar were dispersed in a liquid that comprises 100 parts by weight of a solution of sorbitol with 70% sugar content and 50 parts by weight of water, and the liquid was heated and dissolved. When 60 parts by weight of water were vaporized from the resultant solution, the remainder maintained a liquid state that inhibited formation for gels after cooling. When 20 parts by weight of this liquid thickening agent were dispersed in 100 parts by weight of water, gel was formed.

In the case of gellan gum, where cations equivalent to 5 or more weight percent at common salt concentration are employed at the same time in the third method, the solution can be inhibited from gelling and maintained to be still in liquid state.

It is preferable that the liquid thickening agents obtained by the above methods form a viscous solution when they are added to the water-containing object, such as food, by an equivalent or less. Namely, the liquid thickening agent is desirably employed by an equivalent or less in order to be supplementally used for the purpose of thickening food. In addition, the liquid thickening agent is significant as a supplemental food additive if a viscosity-increasing effect is larger than a viscosity-decreasing effect caused by dilution. In other words, it is desirable as a supplemental liquid additive that when it is used, it is sufficiently low in viscosity and when it is added to food, it easily diffuses over the whole food and forms a higher viscous solution of the original liquid.

In addition, the desirable reason for adding the liquid additive thickener, according to the present invention, to the object containing water by the equivalent or less is to prevent the object from missing other functions thereof, for example, reducing the original taste in the case of food. For this reason, it is preferable that the amount to be used is as small as possible. It is not desirable, however, that the liquid thickening agent have high viscosity and poor fluidity in order to impart viscosity on the object and gelate it with only a small amount of the liquid thickening agent. In addition, such a liquid thickening agent is preferable that can be easily dispersed and dissolved in the object and can form a viscous solution and gelling in a short time. Accordingly, it is preferable that a liquid ratio of the liquid thickening agent to the object is selected in consideration of these matters.

Further, the liquid additive thickener, according to the present invention, is preferably employed as an addition to food for persons with mastication and deglutition difficulties to prevent complications in deglutition. For such use, it is preferable that the liquid additive thickener is separated little by little and contained individually either in a portion container or a small bag.

The liquid additive thickener, according to the present invention, may be prepared as separate first and second liquids to be added in an object to form a viscous solution or gel by a reaction between the first and second liquids. For example, the first and second liquids comprise different thickening agents that can cause thickening or coagulating when they are combined to react with each other. Alternatively, the first liquid may be a solution of a thickening agent, and the second liquid may be a solution that contains an ion reactive with the thickening agent of the first liquid. In this case, they are combined for thickening or coagulating.

Effective combinations include: a solution of carrageenan and a solution of locust bean gum; a solution of carrageenan and a solution of potassium chloride; a solution of xanthan gum and a solution of locust bean gum; a solution of xanthan gum and a solution of guar gum; a solution of pectin and a solution that contains calcium ion; and sodium alginate and a solution than contains calcium.

As a method of simultaneously adding two liquids to an object, it is preferable to use such a container as Dispenpax that contains two liquids in separate packages which can be taken out at the same time for use.

An example that employs two liquids is shown below.

A first liquid is prepared by dissolving 5 parts by weight of LM pectin, 6 parts by weight of citric acid and 4 parts by weight of sodium citrate into 100 parts by weight of water. A second liquid is prepared by dissolving 5 parts by weight of calcium lactate into 100 parts by weight of water. When 30 parts by weight of the first liquid and 20 parts by weight of the second liquid were dispersed and dissolved into 100 parts by weight of water, gel was formed.

Another example that employs two liquids is shown below.

A first liquid is prepared by dissolving 10 parts by weight of sodium alginate into 100 parts by weight of a mixed solvent of water and ethanol (at a mixed weight ratio of water to ethanol=3:2) in a state of inhibiting viscosity. A second liquid is prepared by dissolving 5parts by weight of calcium lactate into 100 parts by weight of water. When 10 parts by weight of the first liquid and 10 parts by weight of the second liquid were dispersed and dissolved into 100 parts by weight of water, gel was formed.

As described above, the liquid additive thickener, according to the present invention, is a liquid thickening agent that can be easily added to an object to thicken or coagulate, which has the following advantages:

(a) time and labor, such as heating, is not required;
(b) a lump is not made as is in the case of powder;
(c) viscous solutions of gels are formed faster than the case of dissolving powers;
(d) even if the object contains a salt component or calcium as in the case of mile and the thickening agent is reactive with these, by previously preparing the thickening agent as a dissolved product, the thickening agent can be dissolved in the object to form viscous solution or gels; and
(e) in case of reactive liquids, they are maintained in a two-liquid state and can be mixed to react for use.

Having described the embodiments consistent with the present invention, other embodiments and variations consistent with the present invention will be apparent to those skilled in the art. Therefore, the invention should not be viewed as limited to the disclosed embodiments, but rather should be viewed as limited only by the spirit and scope of the appended claims.

What is claimed is:

1. A liquid additive thickener having fluidity, comprising:
   water;
   a polysaccharide selected from the group consisting of arabic gum, pulluan, soybean polysaccharide and arabinogalactan; and
   a thickening agent selected from the group consisting of guar gum, locust bean gum, tara gum, xanthan gum, tamarind gum, tragacanth gum, karaya gum, konjac mannan, sodium CMC, sodium alginate, pectin, azotobacter vinelandii gum, CMC and methyl cellulose;
   wherein said polysaccharide and said thickening agent are included in said water in an amount such that the liquid additive thickener has a lower viscosity than that of liquid thickening agent only with water; and
   wherein, when the liquid additive thickener is mixed with an aqueous liquid or aqueous liquid solid mixture, it forms a viscous solution or gel.

2. The liquid additive thickener according to claim 1, wherein said liquid additive thickener is prepared as a liquid with a fluidity by adjusting a dissolved concentration of said thickening agent.

3. The liquid additive thickener according to claim 1, wherein said liquid additive thickener is prepared as a liquid with a fluidity by inhibiting said thickening agent from forming a viscous solution.

4. The liquid additive thickener according to claim 1, wherein said liquid is prepared to have a low viscosity by dissolving said thickening agent into water together with a poor solvent.

5. The liquid additive thickener according to claim 4, wherein said poor solvent consists of one selected from ethylalcohol, acetone, isopropylalcohol, fats and oils and surfactants.

6. The liquid additive thickener according to claim 1, wherein said liquid additive thickener is prepared as a liquid with a fluidity by dissolving said thickening agent into water together with the polysaccharide.

7. The liquid additive thickener according to claim 6, wherein said low viscosity polysaccharide is contained 9–50%.

8. The liquid additive thickener according to claim 1, wherein said liquid is prepared as a liquid with a fluidity by containing an ion reactive with said thickening agent to inhibit viscosity formation for a viscous solution.

9. The liquid additive thickener according to claim 8, wherein said reactive ion consists of one selected from potassium ion, calcium ion, magnesium ion and sodium ion.

10. The liquid additive thickener according to claim 1, wherein said liquid is prepared to have a low viscosity by dissolving said thickening agent into water together with a low molecular glucide.

11. The liquid additive thickener according to claim 10, wherein said glucide consists of one selected from Asugar, erythritol, isomerized sugar, grape sugar, starch syrup, fruit sugar, malt sugar, xylose, lactulose, isomalto-oligosaccharide, fructo-oligosaccharide, soybean-oligosaccharide, galacto-oligosaccharide, malto-oligosaccharide, xylo-ogliosaccharide, agar-oligosaccharide palatinose, coupling sugar, maltitol, sorbitol, xylitol, lactitol, palatinit and reduced starch saccharide.

12. The liquid additive thickener according to claim 1, wherein said thickening agent consists of at least one heat reversible coagulating agent selected from agar, gellan gum, carrageenan, furcellaran and gelatin, and said liquid can be maintained at a liquid state that does not cause structural transition when heated to dissolve and then cooled.

13. The liquid additive thickener according to claim 1, wherein said liquid additive thickener is separated little by little and contained individually either in a portion and container or a small bag.

14. The liquid additive thickener according to claim 1, wherein said liquid additive thickener is prepared separately as a first and a second liquid, wherein said first and second liquids are added to said object to form viscous solution through an interaction between said first and second liquids.

15. A method of preparing a liquid additive thickener comprising:
  a) first dissolving a polysaccharide selected from the group consisting of arabic gum, pulluan, soybean polysaccharide and arabinogalactan into water to form a first liquid, and
  b) next mixing a thickening agent selected from the group consisting of guar gum, locust bean gum, tara gum, xanthan gum, tamarind gum, tragacanth gum, karaya gum, konjac mannan, sodium CMC, sodium alginate, pectin, azotobacter vinelandii gum, CMC and methyl cellulose to said first liquid to form a second liquid with fluidity, said thickening agent added in an amount such that the second liquid has a lower viscosity than that of the liquid thickening agent only with water and, when the second liquid is mixed with an aqueous liquid or aqueous liquid solid mixture, it forms a viscous solution or gel.

16. The method according to claim 15, wherein said liquid additive thickener is added in an amount, by weight, less than that of said aqueous liquid or aqueous liquid solid mixture to said aqueous liquid or aqueous liquid solid mixture to form a viscous solution.

17. The method according to claim 15, wherein said aqueous liquid or aqueous liquid solid mixture is a food.

\* \* \* \* \*